United States Patent
Hardin et al.

(10) Patent No.: US 7,045,178 B2
(45) Date of Patent: May 16, 2006

(54) THERMOGRAPHIC OVERCOAT LAYER AND THERMOGRAPHIC IMAGE RECORDING MEMBERS

(75) Inventors: John M. Hardin, Hopkinton, MA (US); Fariza B. Hasan, Waltham, MA (US); Alma J. Padilla, Winchester, MA (US); Michael A. Young, Natick, MA (US)

(73) Assignee: Polaroid Corporation, Waltham, MA (US)

( * ) Notice: Subject to any disclaimer, the term of this patent is extended or adjusted under 35 U.S.C. 154(b) by 82 days.

(21) Appl. No.: 10/371,661

(22) Filed: Feb. 21, 2003

(65) Prior Publication Data

US 2003/0165717 A1 Sep. 4, 2003

Related U.S. Application Data

(60) Provisional application No. 60/358,663, filed on Feb. 21, 2002.

(51) Int. Cl.
*B41M 5/40* (2006.01)
(52) U.S. Cl. ............... 428/32.39; 428/195.1; 503/227
(58) Field of Classification Search ............. 428/32.39, 428/195.1; 503/227
See application file for complete search history.

(56) References Cited

U.S. PATENT DOCUMENTS

| | | | |
|---|---|---|---|
| 4,463,083 A | 7/1984 | Kitajima et al. | 430/273 |
| 4,775,657 A | 10/1988 | Harrison et al. | 503/227 |
| 5,488,025 A | 1/1996 | Martin et al. | 503/227 |
| 5,620,942 A | 4/1997 | Kung et al. | 503/227 |
| 5,981,431 A | 11/1999 | Lawrence et al. | 503/227 |
| 6,228,805 B1 * | 5/2001 | Ohshima et al. | 503/227 |

FOREIGN PATENT DOCUMENTS

EP  0 664 485 A2  7/1995

OTHER PUBLICATIONS

Tremblay C et al: "Miscible blends of Amorphous Polymers" Journal of Polymer Science, Polymer Physics Edition, John Wiley and Sons. New York, US, vol. 22 No. 11, 1984, pp. 1857-1870.

* cited by examiner

*Primary Examiner*—B. Hamilton Hess

(57) ABSTRACT

There is described a protective overcoat material comprising from about 40 weight percent to about 85 weight percent of poly(methyl methacrylate) having a Tg above about 100° C., from about 10 weight percent to about 50 weight percent of poly(ethyl methacrylate) having a Tg of from about 52° C. to about 65° C. and about 1 weight percent of a melt flow modifier. Also described are thermal image recording members which include a protective overcoat layer.

13 Claims, No Drawings

THERMOGRAPHIC OVERCOAT LAYER AND THERMOGRAPHIC IMAGE RECORDING MEMBERS

REFERENCE TO RELATED APPLICATIONS

This application claims the benefit of prior copending provisional application Ser. No. 60/358,663 filed Feb. 21, 2002.

FIELD OF THE INVENTION

This invention is directed to a protective overcoat layer for thermographic image-recording members and to thermal image-recording members which include the protective overcoat layer.

BACKGROUND OF THE INVENTION

There are known a number of thermal imaging systems such as ink jet printing as well as thermal imaging systems which utilize thermal transfer of a colorant such as a dye from a donor sheet to a receiver material. A wide variety of specific mechanisms for thermal transfer have been used heretofore but, as described in "A New Thermal Transfer Ink Sheet for Continuous-Tone Full Color Printer", by M. Kutami et.al., *J. Imaging Science.*, 1990, 16, 70–74, all fall into two broad categories. In the first of these, dyes thermally diffuse from a polymeric binder on a donor sheet into a second polymeric layer on a receiving sheet, in a process commonly called "dye diffusion thermal transfer" (or D2T2; this process is also sometimes called "dye sublimation transfer"). In this type only the dye is transferred, not the binder in which the dye is dispersed on the donor sheet. The second category is commonly referred to as "thermal mass transfer" and in this type both a dye and a carrier vehicle are transferred together from the donor sheet to the receiver sheet.

Thermal mass transfer methods may be further subdivided into those involving differential adhesion, in which a heated plug of material from the donor sheet adheres to the surface of the receiving sheet, and those involving flow penetration in which the colorant on the donor sheet melts at elevated temperature and is transferred into pores on the receiver sheet.

A common problem with images formed with such thermal imaging systems is fading of colors of the images with time because of exposure to routine environmental factors to which images are typically subjected. Such factors include normal wear and abrasion, exposure to visible and ultraviolet light, exposure to moisture, contact with skin oils as a result of being handled by a person's fingers, exposure to air and exposure to ozone. Thus, there is a continuing need for protective overcoat materials which can alleviate the fading of the dyes which form the images.

BRIEF SUMMARY OF THE INVENTION

It is therefore the object of this invention to provide a novel protective overcoat material for images formed by thermal imaging methods.

It is another object of the invention to provide a protective overcoat material which can be transferred thermally to images formed by thermal imaging methods.

It is a further object of the invention to provide a protective overcoat material which can be transferred to a thermally-formed image at relatively low energy.

Yet another object of the invention is to provide a protective overcoat material which can be thermally transferred to an image cleanly with no frayed or uneven edges or cracks and without causing surface roughness.

Still another object is to provide thermal image-recording members which carry an image formed by a thermal imaging method and include a protective overcoat layer.

SUMMARY OF THE INVENTION

According to one aspect of the invention there is provided a protective, thermally-transferable overcoat material comprising from about 40 weight percent to about 85 weight percent of poly(methyl methacrylate), from about 10 weight percent to about 50 weight percent of a copolymer of ethyl methacrylate and about 1 weight percent of a melt flow modifier.

In another aspect of the invention there is provided a thermal image recording member which includes a substrate, an image bearing layer bearing a thermally formed image and an overcoat layer comprising from about 40 weight percent to about 85 weight percent of poly(methyl methacrylate), from about 10 weight percent to about 50 weight percent of a copolymer of ethyl methacrylate and about 1 weight percent of a melt flow modifier.

The protective overcoat layer is abrasion and scratch resistant and provides protection against exposure to ozone and air as well as other factors such as moisture and contact with skin oils. The overcoat layer is preferably formed on a substrate which is removed when the overcoat layer is transferred to a thermal image.

DETAILED DESCRIPTION OF THE INVENTION

The thermal overcoat members of the invention comprise a substrate carrying an overcoat layer according to the invention comprising from about 40 weight percent to about 85 weight percent of poly(methyl methacrylate), from about 10 weight percent to about 50 weight percent of a copolymer of ethyl methacrylate and about 1 weight percent of a melt flow modifier. The overcoat layer may also include additives such as, for example, surfactants, plasticizers, ultraviolet light absorbers, light stabilizers, etc.

The thermographic image-recording members of the invention comprise a substrate, which may be transparent or reflective, an image bearing layer bearing an image formed therein by a thermal imaging method or to which an image has been transferred by a thermal imaging method, and an overcoat layer comprising from about 40 weight percent to about 85 weight percent of poly(methyl methacrylate), from about 10 weight percent to about 50 weight percent of a copolymer of ethyl methacrylate and about 1 weight percent of a melt flow modifier. The image present in the image recording member may be formed by any suitable thermographic imaging material such as, for example, dye diffusion thermal transfer materials and thermal mass transfer materials.

In a preferred embodiment, the image bearing layer is an image receiving layer to which there has been transferred an image formed by a thermal transfer imaging method. A particularly preferred thermal transfer imaging method for forming images which are transferred to the image recording members of the invention comprises a dye-containing amorphous (non-crystalline) phase which includes at least one dye, wherein the dye or dyes present in the amorphous phase form a continuous film. Optionally, and preferably, the thermal transfer imaging material comprises at least one thermal solvent. Thermal transfer imaging materials of this type are disclosed and claimed in prior U.S. patent application Ser. No. 09/745,700, filed Dec. 21, 2000, now U.S. Pat. No. 6,537,410 B2, the entire disclosure of which is incorporated by reference herein in its entirety and made a part of this application.

At least a part of the thermal solvent material is incorporated into the dye-containing phase and another part of the thermal solvent material forms a second crystalline phase separate from the dye-containing phase. The crystalline thermal solvent in the thermal transfer material layer melts and dissolves or liquefies the dye-containing phase thereby permitting dissolution or liquefaction of the dye-containing phase to occur at a temperature lower than that at which such dissolution or liquefaction occurs in the absence of the crystalline thermal solvent.

The thermal transfer material layer is characterized in that it is a solid transparent or translucent film which does not undergo any detectable flow at room temperature and the film is formed by the dye(s) in the amorphous phase.

The dyes which are utilized in this preferred image-forming material layer can be those which form solids which are themselves amorphous, that is to say solids which lack the long-range ordered structure characteristic of crystalline solids. Those skilled in materials science will be familiar with various methods for distinguishing amorphous from crystalline solids; for example, amorphous solids do not give the strong powder X-ray diffraction lines exhibited by crystalline solids, and also lack the strong electron diffraction characteristics of crystalline solids.

In some preferred embodiments of the invention the thermal solvent selected for the transfer layer is a good solvent for the dye(s) of the dye-containing phase. In these embodiments, the dot size of the transferred imaging material may be varied by use of a thermal printing head optimized for variable dot printing. In preferred embodiments where a solution is formed under the imaging conditions transfer of the imaging material can be effected to porous receiver materials. In cases where a low melt viscosity is attained receiver materials having relatively low average pore sizes, e.g., less than about 1 μm may be used.

The two phase embodiment of the invention allows dye transfer to be effected at temperatures substantially lower than those achievable when the transfer layer contains only the same dye-containing phase, and hence with lower energy inputs per unit area imaged. The thermal solvent used can be any fusible material which melts above ambient temperature and which dissolves or liquefies the dye-containing phase to form a mixture which transfers at a lower temperature than that of the dye-containing phase alone. The imaging material which is transferred from the donor sheet to the receiving sheet during the two phase imaging embodiment need not be in the form of a conventional low viscosity true solution, but may be a slurry or similar material. The ratio of thermal solvent to dye may range from about 1:3 by weight to about 3:1. A preferred ratio is about 2:1. Thus, the two phase embodiment of the invention can provide a major reduction of imaging temperature while maintaining a thin donor layer. The thermal solvent may separate into a second phase as the mixture cools after imaging, and preferably the thermal solvent should not form such large crystals that it adversely affects the quality of the resulting image. The thermal solvent preferably has a melting point sufficiently above room temperature such that the donor layer is not tacky at room temperature, and does not melt at temperatures likely to be encountered during transportation and storage of the donor sheet prior to imaging.

The crystalline thermal solvents used in the two-phase embodiments of the invention typically have a melting point in the range of from about 60° C. to about 120° C. and preferably in the range of from about 85° C. to about 100° C. In a preferred embodiment the melting point of the thermal transfer material is high enough that, at the melting point temperature the viscosity of the liquid material is low enough to transfer substantially the entire thickness of the thermal transfer material into the pores of the receiver material in the time allowed for imaging. This property is important in some instances such as variable dot printing, since a roughly gaussian temperature profile is produced over the area of a pixel and should the melted thermal transfer material have a viscosity which may be too high to completely penetrate the pores of the receiver material then there could be formed a relief image in dye at the edges of a dot giving rise to relatively lesser image durability and possibly affecting negatively the transfer of further dye materials in a multicolor system. It is particularly preferred that the thermal solvent have a melting point of about 90° C.

Not all the thermal solvent component of the donor layer, prior to imaging, will crystallize out from the dye-containing phase and form a second phase separate from the dye-containing phase. The amount of thermal solvent in the transfer material layer which is incorporated in the dye-containing phase can be controlled by including additives in the dye-containing phase to make the latter more compatible with the thermal solvent thereby resulting in a higher percentage of the thermal solvent being located in the dye-containing phase. Such additives could be, for example, molecules similar to the thermal solvent which do not crystallize under the conditions of preparation of the donor layer or other additives such as light stabilizers. It is preferred to utilize thermal solvents which form relatively small crystals since these dissolve the dye-containing phase quickly during imaging to provide satisfactory transfer of the dye to the receiver layer.

The relative amounts of thermal solvent which are in the dye containing and second, crystalline phases of the transfer layer can be determined by measuring the heat of fusion of the transfer layer material and comparing the value with the heat of fusion of the same mass of thermal solvent present in the transfer layer. The ratio of the respective values will indicate the proportions of thermal solvent present in the dye-containing phase and the second, crystalline phase.

In the two phase embodiments of the invention a phase change occurs between room temperature and the imaging temperature such that essentially one phase is formed. The dye-containing phase transfer layer, which is not tacky at room temperature, undergoes a composition change such that it has relatively low viscosity at the imaging temperature to allow the imaging material to be transferred to the receiving layer.

In another preferred embodiment more than one thermal solvent is incorporated into the transfer layer. If a transfer layer is used which comprises two (or more) different thermal solvents having differing melting points and chosen so that the thermal solvent having the lower melting point dissolves or liquefies less of the dye-containing phase than the thermal solvent having the higher melting point, the amount of dye-containing phase transferred per imaged pixel during the imaging method varies according to the temperature to which the transfer layer is heated. It has been found possible, with certain imaging systems, to obtain good continuous-tone performance using only two thermal solvents in addition to the dye-containing phase. Such continuous-tone performance is an important advantage of the present invention as compared with conventional thermal mass transfer processes, in which the mass transfer is strictly binary. Alternatively, the use of two or more dyes which have differing solubilities in a single thermal solvent may be employed.

Obviously, the thermal solvent used in any specific imaging system of the present invention must be chosen having regard to the dye-containing phase and other components of the proposed system. The thermal solvent should also be sufficiently non-volatile that it does not substantially sublime from the thin transfer layer during transportation and storage of the donor sheet prior to imaging. Any suitable thermal solvent may be used in accordance with the invention. Suitable thermal solvents include, for example, alkanols containing at least about 12 carbon atoms, alkanediols containing at least about 12 carbon atoms, monocarboxylic acids containing at least about 12 carbon atoms, esters and amides of such acids, aryl sulfonamides and hydroxyalkyl-substituted arenes. Specific preferred thermal solvents include: tetradecan-1-ol, hexadecan-1-ol, octadecan-1-ol, dodecane-1,2-diol, hexadecane-1,16-diol, myristic acid, palmitic acid, stearic acid, methyl docosanoate, 1,4-bis(hydroxymethyl)benzene, and p-toluenesulfonamide. A preferred class of thermal solvents consists of thermal solvents which have a low volatility.

In a preferred embodiment, in the transfer material layer not more than 5% by weight of the material present in the layer should have a molecular weight higher than that of the highest molecular weight dye in the dye-containing phase. The presence of higher amounts of high molecular weight species, particularly polymeric species, results in undesirable, more viscous melts under imaging conditions which can adversely affect transfer of the imaging material to the receiver sheet. Further, this feature of the transfer material layer allows the layer to be coated from a solution which has a relatively low viscosity. It is preferred that the transfer layer include not more than about 2% by weight, and particularly preferably not more than about 1% by weight, of components having a molecular weight higher than that of the highest molecular weight dye in the dye-containing phase. Optimally, the thermal transfer material layer does not include any such higher molecular weight species.

The substrate of the thermal image-recording members of the present invention may comprise any suitable material and numerous suitable support materials are known in the art. Examples of materials suitable for use as substrates for the thermal image-recording members of the invention include polyesters, polycarbonates, polystyrenes, polyolefins, cellulose esters, polysulfones and polyimides. The thickness of the substrate generally may be in the range of from about 1 to about 10 mils. The substrate may also include a backcoat layer. A particularly preferred substrate for the thermal image recording members of the invention comprises an approximately 6 mil thick layer of oriented polypropylene arranged between approximately 2 mil thick layers of polyethylene.

A preferred image recording member of the invention comprises a substrate carrying an image receiving layer to which an image formed by a thermal imaging method has been transferred and a protective overcoat layer comprising from about 40 weight percent to about 85 weight percent of poly(methyl methacrylate), from about 10 weight percent to about 50 weight percent of a copolymer of ethyl methacrylate and about 1 weight percent of a melt flow modifier. A particularly preferred substrate and image receiving layer combination is described and claimed in prior, commonly assigned U.S. patent application Ser. No. 10/159,871 filed May 30, 2002, now U.S. Pat. No. 6,761,788 B2, which is hereby incorporated by reference herein its entirety and made a part of this application. The substrate comprises a layer of a material having a compressibility of at least about 1% under a pressure of 1 Newton per $mm^2$ or a material having a thickness of less than about 50 µm and having a compressibility of less than about 1% under a pressure of 1 Newton per $mm^2$. The image receiving layer has a void volume of from about 40% to about 70% and a pore diameter distribution wherein at least about 50% of the pores having a diameter of greater than about 30 nm have a diameter less than about 300 nm and at least about 95% of the pores having a diameter greater than about 30 nm have a diameter less than about 1000 nm.

The protective overcoat layer comprises from about 40 to about 85 weight percent of a poly(methyl methacrylate) polymer having a relatively high Tg, i.e., above about 100° C. A preferred poly(methyl methacrylate) polymeric material is Paraloid A21 having a Tg of about 104° C., which is commercially available from Rohm and Haas, Incorporated.

The protective overcoat layer further includes from about 10 to about 50 weight percent of an ethyl methacrylate copolymer which has a relatively low Tg, i.e., in the range of from about 52° C. to about 65° C. A preferred ethyl methacrylate copolymer is Neocryl B813, having a Tg of about 65° C., which is commercially available from Avecia Corporation.

The protective overcoat layer also includes a melt flow modifier in a relatively low concentration, for example, about 1 weight percent. As is known in the art, a polymeric melt flow modifier is a material which lowers the melt flow index of a polymeric material. Typical suitable melt flow modifiers include Modaflow Resin Modifier, Modaflow 2100 and Multiflow, which are commercially available from Solutia, Inc. Generally, the melt flow index of a molten polymeric material can be measured by ASTM Procedure D 1238.

A preferred melt flow modifier is Modaflow Resin Modifier, a low molecular weight ethyl acrylate-2-ethylhexyl acrylate copolymer.

The protective layer may also contain other additives such as, for example, surfactants, plasticizers, ultraviolet light absorbers, light stabilizers, etc. In a preferred embodiment the protective overcoat layer includes Tinuvin 771, an ultraviolet light-absorbing material, and Tinuvin 770, a hindered amine light-stabilizing material, both available from Ciba-Geigy.

A particularly preferred overcoat layer comprises about 73 percent by weight of poly(methyl methacrylate) (Paraloid A21), about 10 percent of poly(ethyl methacrylate) (Neocryl B813), about 1 percent of a melt flow modifier (Modaflow Resin Modifier), about 15 percent of an ultraviolet light-absorbing material (Tinuvin 771) and about 1 percent of a light-stabilizing material (Tinuvin 770).

The protective overcoat layer is initially disposed on a substrate and typically may be from about 1 to about 5 microns in thickness, preferably about 1.6 microns. The overcoat layer is preferably coated on the substrate from a solution in an organic solvent. A preferred coating solvent comprises a mixture of about 80% methyl ethyl ketone and about 20% toluene (by weight). The overcoat layer may be formed by any suitable coating method such as slot coating and gravure coating. Typically, the coating solutions used in slot coating applications have about 18 percent solids and those used in gravure coating solutions have about 25 percent solids. After the thermal image is formed in, or transferred to, the image recording member the overcoat layer is thermally transferred over the image material, typically by means of a heated roller or thermal print head or line heater, and the substrate carrying the protective layer is stripped away and discarded. The protective overcoat layer can be transferred advantageously at relatively low energy levels, for example, at about 1 joule/cm$^2$.

The overcoat layer of the invention transfers cleanly without any appreciable occurrence of frayed or uneven edges or cracks and adheres well to the substrate of the image-recording member to which it is transferred.

EXAMPLES

The invention will now be described further in detail with respect to specific preferred embodiments, it being understood that these are intended to be illustrative only and the invention is not limited to the materials, process parameters, etc. recited therein. All parts recited in the examples are by weight unless otherwise stated.

Example I

Three overcoat layer formulations according to the invention, as shown in Table I, were prepared and each was coated on a separate poly(ethylene terephthalate) substrate material, having a thickness of about 4.5 microns, at an overcoat layer thickness of about 2.5 microns.

Each overcoat layer was thermally transferred over a thermal image recording member having a substrate made up of an approximately 6 mil thick layer of oriented polypropylene arranged between approximately 1 mil thick layers of poly(ethylene terephthalate) and an image receiving layer to which there had been transferred a thermal image formed according to the method described in the above-identified, prior co-pending U.S. patent application Ser. No. 09/745,700, filed Dec. 21, 2000.

TABLE I

|  | A | B |
| --- | --- | --- |
| Paraloid A21 | 46% | 62% |
| Neocryl B813 | 46% | 30% |
| Modaflow | 1% | 1% |
| Tinuvin 328 | 6% | 6% |
| Tinuvin 770 | 1% | 1% |

The images prepared as described above were tested for ozone resistance. The tests were conducted in an ozone chamber constructed from a large Pyrex jar having a volume of approximately 1.2 ft.$^3$ and a low pressure mercury-argon lamp (Oriel 6035). Ozone was produced in situ by the direct photolysis of oxygen in the ambient air within the chamber. A fan in the chamber ensured that all the samples were uniformly exposed to the ozone.

The lamp power supply was energized under the control of a timer such that the lamp was on for 15 minutes every two hours thereby producing an average ozone concentration of about 10 PPM (24 mg/m$^3$). The test was carried out for 16 hours, or 8 lamp cycles. Control prints, including thermal images formed according to the method of Ser. No. 09/745,700 without any overcoat layer and prints with overcoat layers of other materials were included in all cases. To facilitate examination of the prints, they were scanned at 300 dpi with a flat bed scanner before and after the ozone exposure test.

The image-recording members according to the invention were found to be resistant to ozone fading, even after being stressed with a 180 degree wrap around a ⅜ inch mandrel. Overcoats of other materials exhibited cracking and ozone-induced fading.

Example II

An overcoat layer formulation according to the invention, as shown in Table II, was prepared. The solids were dissolved in a mixture of 75 percent MEK and 25 percent toluene and coated on a polyethylene terephthalate substrate having a thickness of about 4.5 microns at an overcoat layer thickness of about 1.6 microns.

TABLE II

|  | A |
| --- | --- |
| Paraloid A21 | 73 |
| Neocryl B813 | 10 |
| Modaflow | 1 |
| Tinuvin 771 | 15 |
| Tinuvin 770 | 1 |

Each overcoat layer was thermally transferred over a thermal image recording member having a substrate as described in Example I and an image receiving layer to which there had been transferred a thermal image formed according to the method described in the above-identified, prior co-pending U.S. patent application Ser. No. 09/745,700, filed Dec. 21, 2000.

A roll of the overcoat material prepared as described above was tested for blocking under a pressure of 36 lbs/in$^2$ by forming a roll of the material and placing it in a 50° C.-50% RH oven for one day to determine whether the overcoat material would transfer to the material on the back of the substrate or vice versa. The overcoat material gave an acceptable result.

The image recording member was subjected to face to face and face to back blocking tests, under a pressure of 3 lbs/in$^2$ by placing it in a 50° C. dry oven for three days. The image recording member did not exhibit any face-to-face or face to back blocking.

The image recording member was subjected to a durability test using a CM-5 Crock Meter (Atlas Textile Testing Products, Inc.) by placing it under the stylus with a 900 gram load and moving the stylus across the image for 20 cycles. The image gave acceptable results with only very slight indication of abrasion and no image marring nor any dye transfer. A control image with no protective overcoat showed visible dye transfer and visible abrasion marks.

The image recording member was subjected to water rub testing and oil rub testing (using a formulation based on ingredients in skin oil), both for 40 cycles, using the same Crock Meter. The control image with no protective overcoat was destroyed in both the water and oil rub tests. The image recording member according to the invention exhibited no visual defects in the water test and only some slight oil marks on the image in the oil test with the images being undisturbed.

The image was tested for gloss according to ASTM D 523 using a Gardner micro-TRI-gloss meter (BYK Gardner USA, Silver Spring, Md.). The following results were obtained with the control and the image recording member according to the invention.

|         | Black |      | White |      |
|---------|-------|------|-------|------|
|         | 20°   | 60°  | 20°   | 60°  |
| Control | 18.4  | 54.4 | 45.9  | 43.7 |
| A       | 42.6  | 77.8 | 67.2  | 88.8 |

Each value shown is the average of two tests.

It can be seen that the image recording member of the invention exhibited significantly higher gloss than the control.

An image recording member which was identical to that previously described in this example with the exception that the substrate was the same as that described in Example I was subjected to an ozone test as described in Example I. The image recording member was found to be resistant to ozone fading even after being stressed with a 180 degree wrap around a 4 inch mandrel.

Example III

Two overcoat layer formulations, according to the invention, as shown in Table III, were prepared and coated on separate substrates as described in Example II.

TABLE III

|              | A  | B  |
|--------------|----|----|
| Paraloid A21 | 62 | 62 |
| Neocryl B813 | 30 | 27 |
| Modaflow     | 1  | 1  |
| Tinuvin 326  | 6  | 9  |
| Tinuvin 770  | 1  | 1  |

Images were formed and transferred to image recording members as described in the previous examples followed by transferring thereto an overcoat layer. The images were tested as described in Example II.

The overcoat material did not exhibit any donor blocking. Image recording member A, tested under a pressure of 10 lbs. and 50 lbs., respectively, did not exhibit any face to face blocking. Image recording member B did not exhibit any face to face blocking at 10 lbs. pressure and only slight blocking at 50 lbs. with neither marring nor image dye transfer.

The image recording members were found to be resistant to ozone fading even after being stressed with a 180 degree wrap around a 7/16 inch mandrel.

The results of the gloss measurements are shown below.

|   | Black |      | White |      |
|---|-------|------|-------|------|
|   | 20°   | 60°  | 20°   | 60°  |
| A | 42.1  | 78.1 | 54.2  | 88.7 |
| B | 29.3  | 64.6 | 39.9  | 86.4 |

Each value shown is the average of three tests.

It can be seen that the image recording members exhibited acceptable gloss.

Both image recording members, when tested for durability, exhibited only traces of abrasion. In the water and oil rub testing, both image recording members exhibited no visual defects.

Although the invention has been described in detail with respect to various preferred embodiments, it is not intended to be limited thereto, but rather those skilled in the art will recognize that variations and modifications are possible which are within the spirit of the invention and the scope of the appended claims.

What is claimed is:

1. A thermal image recording member comprising a substrate carrying a layer bearing an image and a protective overcoat layer overlying said image, said protective overcoat layer comprising from about 40% to about 85% by weight of poly(methyl methacrylate) having a Tg above about 100° C., from about 10% to about 50% by weight of poly(ethyl methacrylate) having a Tg of from about 52° C. to about 65° C. and about 1% by weight of a melt flow modifier, wherein said melt flow modifier lowers the melt flow index of said poly(methyl methacrylate) and said poly(ethyl methacrylate).

2. The image recording member as defined in claim 1 wherein said substrate comprises an approximately 6 mil thick layer of oriented polypropylene arranged between two approximately 2 mil thick layers of polyethylene.

3. The image recording member as defined in claim 1 wherein said poly(methyl methacrylate) has a Tg of about 104° C.

4. The image recording member as defined in claim 3 wherein said poly(ethyl methacrylate) has a Tg of about 65° C.

5. The image recording member as defined in claim 4 wherein said melt flow modifier is ethylacrylate-2-ethylhexylacrylate copolymer.

6. The image-recording member as defined in claim 1 wherein said protective overcoat layer is from about 1 to about 5 microns in thickness.

7. The image recording member as defined in claim 6 wherein said protective overcoat layer is about 1.6 microns in thickness.

8. The image recording member is defined in claim 1 wherein said protective overcoat layer further includes an ultraviolet light-absorbing material and a light-stabilizing material.

9. A protective overcoat material for an image formed by a thermal imaging method comprising a substrate carrying an overcoat layer comprising from about 40 weight percent to about 85 weight percent of poly(methyl methacrylate) having a Tg above about 100° C., from about 10 weight percent to about 50 weight percent of poly(ethyl methacrylate) having a Tg of from about 52° C. to about 65° C. and about 1 weight percent of a melt flow modifier, wherein said melt flow modifier lowers the melt flow index of said poly(methyl methacrylate) and said poly(ethyl methacrylate).

10. The protective overcoat material as defined in claim 9 wherein said poly(methyl methacrylate) has a Tg of about 104° C.

11. The protective overcoat material as defined in claim 10 wherein said poly(ethyl methacrylate) has a Tg of about 65° C.

12. The protective overcoat material as defined in claim 11 wherein said melt flow modifier is ethylacrylate-2-ethylhexylacrylate copolymer.

13. The protective overcoat material as defined in claim 9 and further including an ultraviolet light absorbing material and a light stabilizing material.

* * * * *